United States Patent [19]

Richardson

[11] 4,233,806
[45] Nov. 18, 1980

[54] SELF-BAGGING DEVICE FOR POWERED LAWN TOOLS

[76] Inventor: Charles M. Richardson, 133 Lodge Ave., Huntington Station, N.Y. 11746

[21] Appl. No.: 13,284
[22] Filed: Feb. 21, 1979
[51] Int. Cl.³ .......................................... A01D 35/26
[52] U.S. Cl. ................................... 56/202; 56/16.6; 56/320.2
[58] Field of Search ................ 56/320.1, 320.2, 202, 56/255, 16.6, 13.3, 13.4

[56] References Cited

U.S. PATENT DOCUMENTS

| | | | |
|---|---|---|---|
| 2,990,666 | 7/1961 | Blume | 56/320.2 |
| 3,199,277 | 8/1965 | Moody | 56/202 |
| 3,624,989 | 12/1971 | Gatheridge | 56/202 |
| 3,708,968 | 1/1973 | Enters et al. | 56/202 |
| 3,722,192 | 3/1973 | Corbett | 56/202 |
| 3,777,461 | 12/1973 | Giraud | 56/202 |
| 3,802,173 | 4/1974 | Opitz | 56/202 |
| 3,952,484 | 4/1976 | Van Swearingen | 56/320.2 |
| 3,971,198 | 7/1976 | Lane | 56/202 |
| 3,987,606 | 10/1976 | Evans | 56/202 |

*Primary Examiner*—Jay N. Eskovitz
*Attorney, Agent, or Firm*—Pennie & Edmonds

[57] ABSTRACT

Improvements are described in self-bagging devices for collecting lawn clippings. A substantially impermeable disposable lawn bag is mounted underneath a movable frame above and behind the lawn mower or like instrument. The open end of the bag fits around a perforate member secured to the frame. A permeable bag is mounted above the perforate member. A chute connects a port in the housing of the lawn mower to the enclosure defined by the impermeable bag and the perforate member.

15 Claims, 4 Drawing Figures

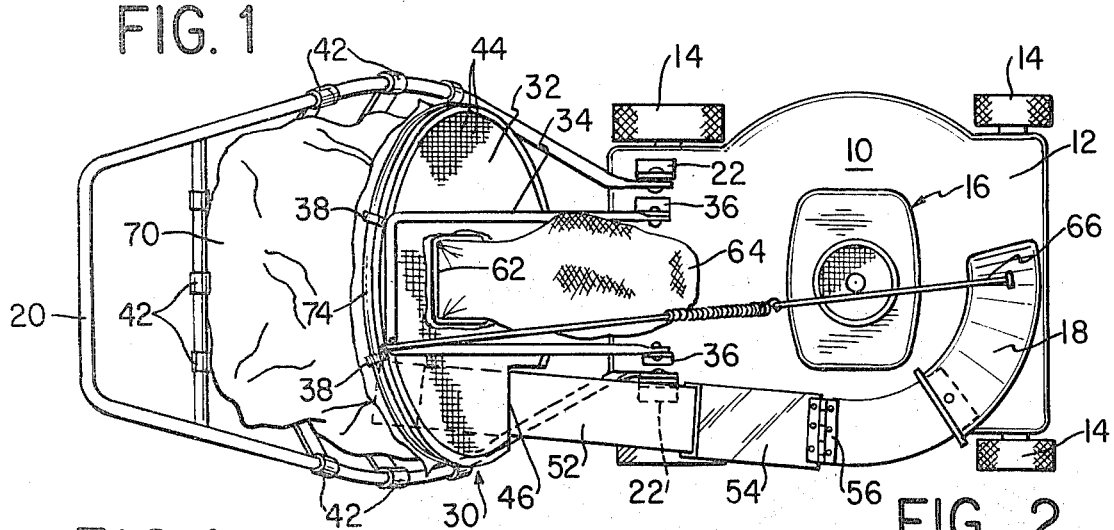
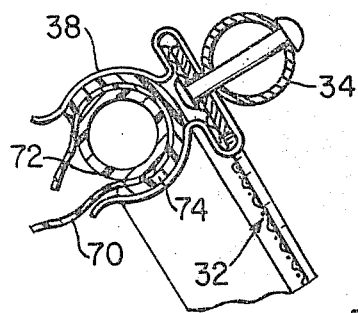
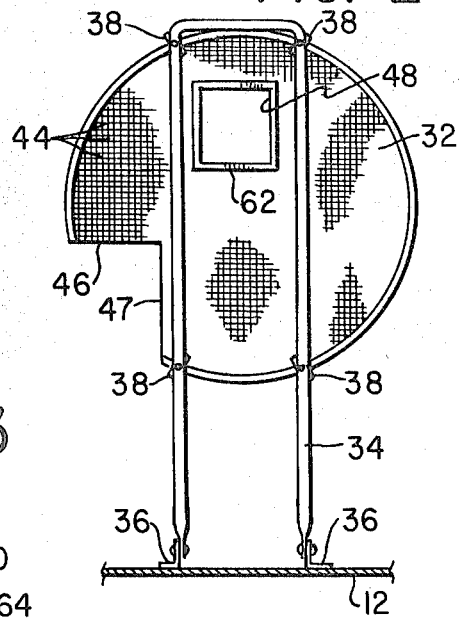
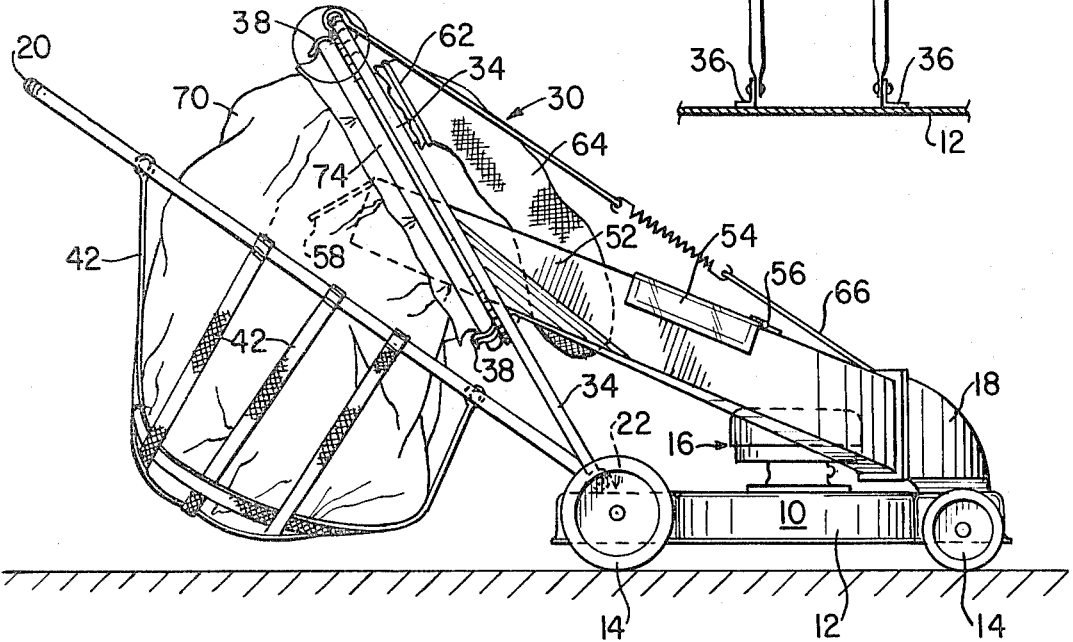

SELF-BAGGING DEVICE FOR POWERED LAWN TOOLS

BACKGROUND OF THE INVENTION

This concerns a device for automatic bagging of lawn clippings, such as grass and/or leaves, in disposable bags such as the plastic lawn bags familiar to all. Since the invention is particularly useful as an attachment to a powered lawn mower, it will be described in such context. It will be recognized, however, that the invention may also be practiced in the form of a lawn sweeper with no mowing capability.

The advantages of a self-bagging lawn mower attachment have been recognized and numerous designs have been patented. These designs generally include a rigidly mounted bag holder around which the open end of a lawn bag is secured and a chute attached at one end to the discharge orifice from the lawn mower housing and at the other end to the bag holder. See for example U.S. Pat. Nos. 3,624,989; 3,722,192; 3,971,198 and 3,987,606. Many of these devices however are not commercially attractive since they do not provide an effective means of separating the air-entrained clippings from the air stream that blows the clippings through the chute and into the bag. The basic problem is that disposable lawn bags are made of impermeable plastic which requires air exhaustion to be made through the open top of the bag at the very point where the air-entrained clippings are being blown into the bag. This frequently results in clogging of the filter used to separate the clippings from the air stream. This is turn raises the back pressure in the bag, slowing down the air stream in the chute and reducing the collection efficiency of the lawn mower. As the air stream slows down, clippings are deposited in the chute and frequently the chute becomes clogged, causing the clippings to be scattered on the lawn.

The rigid mounting of the bag holder is another deficiency of previous designs. Rigid mountings tend to be heavy. Since the lawn bag is mounted behind the rear wheels of the mower, the weight of the mounting and the clippings in at least large bags tends to unbalance the mower, requiring a separate wheel or slide to support the bag. See, for example, U.S. Pat. Nos. 3,624,989 and 3,987,606. Such an arrangement is bulky and difficult to maneuver and its total weight is frequently unacceptable especially in lawn mowers that are not self-propelled. I have observed that a rigid bag mounting poses a further problem in that the bag often fills unevenly which has a tendency to strain the bag and sometimes tear it.

SUMMARY OF THE INVENTION

I have found that clogging problems can be greatly reduced by use of a two stage filter in the bagging apparatus. In the preferred embodiment of my invention, a perforate member is mounted on a movable frame between the handles of the lawn mower. This member comprises a circular screen in which there are two large holes. An impermeable plastic collection bag is mounted so that its open end is adjacent the periphery of this screen. A chute is connected between the discharge orifice in the lawn mower and one of the holes in the screen. On the other hole is mounted a large bag made of a permeable material. On the end of the chute inside the enclosure formed by the collection bag and the perforate member, a deflection plate directs the stream of air-entrained lawn clippings down into the bag.

The area of the screen is at least several times the cross sectional area of the chute. I have found that this ratio and the downward deflection of the air-entrained clippings produces a sufficient change in velocity and direction of the air carrying the clippings into the bag that grass cuttings and moist leaves are usually separated from the air stream before the air stream goes out through the screen. In some applications, however, this is insufficient to separate all the material from the air stream. For example, dry leaves have a tendency to cling to and clog the screen thereby increasing the back pressure in the bag and chute and decreasing the collection efficiency of the lawn mower. I have found, however, that by providing the second hole in the screen and mounting a large air permeable bag over such hole the collection efficiency of the equipment remains at a high level over extended use. The air permeable bag provides a second stage of filtration. Since the hole opening into this bag is relatively small, not many leaves find their way into it and it takes considerable time for the bag to fill up. The large surface area of the bag, however, permits the ready escape of air. In many cases, the fabric collection bag that is normally used to collect lawn clippings can be used to provide this second stage of filtration.

Because of the simplicity of this equipment it is relatively light in weight and can easily be mounted on the rear deck of a lawn mower adjacent the handle mountings but independent of the handle. A guy wire and spring supporting the upper end of the movable frame permit the frame to tilt backwards under the weight of the clippings in the bag attached to the frame. This I have found has the advantage of shifting the load in the bag, helping to fill the bag more fully without straining and without danger of rupturing it.

In addition, the movable frame, the mounting of the lawn bag and the shape of the perforate member cooperate to facilitate the attachment and removal of the lawn bag to the mower and its removal therefrom. Preferably, each lawn bag is held open by an annular ring over which the open end of the bag is draped and then secured. This mounting ring and the means for securing the bag to the ring are not permanently attached to the lawn mower, making it possible to mount the bag on a ring at any convenient place. The ring with the bag attached is then inserted into four clips which are fastened to the movable frame adjacent the periphery of the perforate member. As a result, the open end of the bag is held against the circumference of the circular screen. To permit quick removal of the lawn bag, the movable frame may be tilted forward while the mounting ring for the lawn bag is detached from the four clips which hold it.

BRIEF DESCRIPTION OF THE DRAWING

These and other subjects and features of my invention will be more readily apparent from the following detailed description of the preferred embodiment in which:

FIG. 1 is a top view of an illustrative embodiment of a lawn mower which has been modified in accordance with the teachings of my invention;

FIG. 2 is a front view of certain elements of the illustrative embodiment of my invention shown in FIG. 1;

FIG. 3 is a right side view of the lawn mower of FIG. 1; and

FIG. 4 is an exploded view of a detail of FIG. 3.

DETAILED DESCRIPTION OF THE INVENTION

As shown in FIGS. 1 and 3 a conventional rotary lawn mower 10 comprises a housing 12 which rides on two front and two rear wheels 14, a motor 16 on top of the housing, a discharge chute 18, and a push handle 20 which is mounted in flanges 22 on the rear deck of housing 12.

I have modified such a lawn mower to provide a self-bagging device 30 which comprises a perforate member 32 mounted on a support frame 34, a bag support 42, a chute 52 and a guy wire and spring 66. Frame 34 is a U-shaped tube, having two parallel shafts. The two ends of these shafts are mounted in flanges 36 on the rear deck of housing 12 so as to rotate about an axis through said flanges and approximately parallel to the ground. The upper end of frame 34 is supported by guy wire and spring 66 upwardly and rearwardly of housing 12. As shown more clearly in FIG. 2, perforate member 32 is preferably a circular piece of screen in which there are numerous small exhaust holes 44 and two large holes 46 and 48. As shown in FIGS. 1 and 3, chute 52 passes through the first hole 46. A cowling 62 surrounds hole 48 and provides a mounting point for a permeable bag 64.

As shown in FIGS. 2, 3 and 4 spring clips 38 are provided on frame 34 for fastening an air impermeable bag 70 beneath perforate member 32. Preferably, the impermeable bag is held open by folding it over an annular ring 72 and securing the folded over portions of the bag to the ring. This may readily be accomplished by a second annular ring 74 with a C-shaped cross-section that is shaped to fit tightly over the first annular ring. Such a pair of matching plastic hoops for accomplishing this function are sold commercially under the name Handy-Hoop by Dynamic Form Systems, Inc. of Scotch Plains, New Jersey. Such devices are also described in U.S. Pat. No. 3,893,649 which is incorporated herein by reference. As shown in the drawing, the clips and ring hold the open end of bag 70 against the circumference of perforate member 32. Obviously, an air tight seal of the bag to the perforate member is not required but the fit should be good enough that there is little or no escape of the clippings entrained in the air. Numerous other types of mountings will be apparent which accomplish the same function.

Chute 52 connects the standard discharge port 18 of the lawn mower to hole 46 in perforate member 32. To reduce the weight on frame 34, the chute is preferably mounted rigidly on, and wholly supported by, housing 12 and fits loosely through hole 46 in perforate member 32. To minimize clogging in the chute the angle between the chute and the ground should be as small as possible, consistent with the need to position the discharge end of the chute above the lower lip of the open end of the lawn bag. In practice, I have found that if the angle between the chute and the ground is approximately 35 degrees the chute will perform satisfactorily with conventional lawn mowers and lawn bags that are up to approximately six bushels in size.

The chute is provided with a transparent panel 54 mounted on a hinge 56. Panel 54 permits the operator to determine if the chute is clogged; and if it is, the chute can readily be cleared by opening the panel and removing the debris entrapped therein. Advantageously, panel 54 should be provided with a clasp (not shown) to hold it closed. The upper end of the chute is provided with a deflector 58 within the enclosure formed by perforate member 32 and bag 70. The deflector directs the stream of air entrained clippings down toward the bottom of the bag which aids in separating the clippings from the air stream. Advantageously, the deflector is made of metal to provide substantial protection to the operator in the event a rock or similar object is thrown up the chute by the whirling blades of the lawn mower. For optimum efficiency of the chute, it is preferable that the cross-sectional area of the chute be approximately constant from the point at which the air leaves housing 12 to the point where the chute terminates inside bag 70. In practicing my invention this cross-sectional area has been approximately 20 square inches.

Bag 70 is supported by bag support 42 which may be a fabric bag or a suitable mesh of webbing. To provide a support clear of the ground and independent of the movement of frame 34, the bag support is attached to handle 20. Because the open end of the collection bag 70 is secured to perforate member 32, the top end of the bag is free to move with frame 34 under the constraints of guy wire and spring 66. With the movement of the lawn mower across the lawn, the upper end of bag 70 is subjected to a shaking motion which facilitates the settling of the clippings into the bag. As the weight of the clippings accumulate in the bag, frame 34 settles lower supported by guy wire and spring 66. This tends to relieve some strains in the filling bag thereby reducing the chance of rupture.

Perforate member 32 is preferably a flat screen having a mesh size of one-quarter inch. I have found that this size is adequate to retain within bag 70 almost all of the grass cuttings and leaves that would be found in the air stream discharged from a lawn mower under ordinary usage. Smaller or larger holes may be used as circumstances permit. The diameter of the perforate member that I have used is approximately 18 inches. I estimate that the free air space through this member is approximately 120 square inches. Since the cross-sectional area of chute 52 is approximately 20 square inches, the ratio between the free air space permitting exhaust of air through the perforate member and the cross-sectional area of the intake port is approximately six-to-one. Obviously, higher ratios can also be used and I estimate that ratios as low as three-to-one would provide acceptable performance.

Hole 46 is advantageously a right-angled wedge cut out of the periphery of the screen. As shown in the drawing, the sides of the wedge or gap in the screen are oriented so that one side 47 is substantially parallel to the two parallel members of frame 34. The shape of hole 46 and its position on the periphery of the screen facilitate the movement of frame 34 and the mounting of bag 70 on this frame. If desired, chute 52 may discharge into bag 70 through holes of other shapes and location in perforate member 32. However, the hole should be shaped to permit the frame and perforate member to rotate about the axis thrugh flanges 36.

My invention has performed adequately using a perforate member made of a screen and only one large hole 46. However, in some applications such as the collection of leaves I have found it preferable to use a two stage filter in filling bag 70. Dry leaves tend to collect on the inside surface of the perforate member clogging exhaust holes 44. The problem is not solved by increasing the size of these holes; and, of course, increasing the size also tends to make the resulting device impractical for use in collecting smaller clippings such as grass clippings. I have found, however, that the problem can largely be solved by providing a second large hole 48 in the perforate member and mounting thereon a large air permeable bag 64. The area of hole 48 should be approximately the same as the cross-sectional area of chute 52. Preferably, the bag can be a woven bag of fabric or plastic such as that conventionally used in collecting lawn clippings prior to transfer to plastic lawn bags or some other disposal means. The bag is mounted around hole 48 by a cowling 62.

In using such a two stage filter any blockage of exhaust holes 44 in perforate member 32 has little effect on the efficiency of the device. To whatever extent holes 44 are clogged, the air flow through hole 48 increases and this air is easily exhausted through the open mesh of bag 64. The number of leaves that are drawn into bag 64 by this process is relatively small since hole 48 is only a small area in perforate member 32. As a result, it takes a considerable time for bag 64 to fill with leaves; and several disposable bags 70 can normally be filled with leaves before it is necessary to empty bag 64.

As will be apparent, the foregoing bagging device can readily be retrofitted to many existing lawn mowers. It is only necessary to provide perforate member 32, support frame 34, bag support 42, chute 52 and the guy wire and spring 66. For most lawn mowers the handles are mounted so that they can rotate on axles in flanges 22. These can generally be used to mount frame 34 so that it is free to rotate independently of the handle. Thus, no modifications to the lawn mower are needed to mount frame 34 on the lawn mower. Cowling 62 can readily be designed so as to mount the collection bag that is customarily supplied with the lawn mower. Obviously, chute 52 must be designed so as to mate with the discharge chute 18 of the lawn mower to which it is retrofitted. In some cases such discharge chutes have a cross section which increases significantly from the interior of the lawn mower housing to the point at which chute 52 would be attached. In such cases it is desirable to modify such chute so as to maintain a uniform cross sectional area from the interior of the housing to the point of discharge into bag 70. This assures that the air velocity in the chute remains constant and reduces the possibility of clogging.

Alternatively, the foregoing bagging device can also be implemented in a powered lawn sweeper with no mowing capability It is only necessary to provide some means for entraining grass, leaves and the like in an air stream and driving said stream up a chute. Suitable devices for entraining such debris are well known. They can readily be used with the perforate member, movable frame, bag support and chute described herein.

As will be apparent to those skilled in the art, numerous modifications may be made to my invention without departing from the spirit and scope thereof. For example, while perforate member 32 is preferably circular, my invention may be practiced using perforate members of other shapes. In general, the shape of the periphery of the perforate member is dictated by the shape of the object that holds open the disposable bag 70. Since the simpler shapes of such an object are flat as in the case of a triangle or square or outwardly curving as in the case of an annulus, the shape of the periphery of the perforate member will be flat or outwardly curving. Of course, in cases where the hole through which chute 52 discharges is a gap in the periphery of the perforate member, the periphery will be inwardly curving in that region.

I claim:

1. In a lawn tool comprising a motor and a housing mounted on wheels in which grass cuttings and/or leaves are discharged in a stream of air through a port in said housing, means for collecting said cuttings and/or leaves comprising:
    (a) a frame mounted toward the rear of said housing and extending upwardly and rearwardly of said housing;
    (b) a perforate member attached to said frame, said perforate member containing therein first and second large holes and a plurality of small holes;
    (c) means for mounting a substantially impervious container beneath said perforate member with the upper periphery of said container against the periphery of said perforate member;
    (d) a chute connecting said port in said housing to said first large hole in said perforate member;
    (e) said small holes in said perforate member being sized to permit the flow of air therethrough while substantially blocking the flow of solid matter entrained in such air; and
    (f) means for mounting on said perforate member a container which is permeable to air, said mounting means holding an open end of said container adjacent said second large hole such that air flowing from said hole enters the open end of said container.

2. In a lawn tool comprising a handle, a motor and a housing mounted on wheels in which grass cuttings and/or leaves are discharged in a stream of air through a port in said housing, means for collecting said cuttings and/or leaves comprising:
    (a) a frame mounted toward the rear of said housing so as to rotate about an axis substantially parallel to the ground;
    (b) means for supporting said frame on said housing, independent of said handle, in a position extending upwardly and rearwardly of said housing;
    (c) a perforate member attached to said frame at a point removed from said axis of rotation, said perforate member containing therein at least one large hole and a plurality of small holes;
    (d) means for mounting a substantially impervious container beneath said perforate member with the upper periphery of said container against the periphery of said perforate member, the lowest edge of the upper periphery of said container being substantially above the ground;
    (e) a chute connecting said port in said housing to said large hole in said perforate member, said chute having a curved portion at the end which is connected to said port and a substantially straight portion extending between said curved portion and said large hole in said perforate member; and
    (f) said small holes in said perforate member being sized to permit the flow of air therethrough while substantially blocking the flow of solid matter entrained in such air, whereby grass cuttings and/or leaves discharged through said port are collected in said substantially impervious container.

3. The apparatus of claim 2 wherein the chute is provided with at least one transparent panel which permits one to view the interior thereof.

4. The apparatus of claim 2 wherein the chute is provided with an access port large enough to permit the clearance of blockages in said chute.

5. The apparatus of claim 2 wherein the cross-sectional area of the chute is approximately the same from the port in said housing to the point where the chute discharges through said large hole in said perforate member.

6. In a lawn tool comprising a motor and a housing mounted on wheels in which grass cuttings and/or leaves are discharged in a stream of air through a port in said housing, means for collecting said cuttings and/or leaves comprising:
 (a) a frame mounted toward the rear of said housing so as to rotate about an axis substantially parallel to the ground;
 (b) means for supporting said frame in a position extending upwardly and rearwardly of said housing;
 (c) a perforate member attached to said frame at a point removed from said axis of rotation, said perforate member containing therein first and second large holes and a plurality of small holes;
 (d) means for mounting a substantially impervious container beneath said perforate member with the upper periphery of said container against the periphery of said perforate member;
 (e) a chute connecting said port in said housing to said first large hole in said perforate member;
 (f) said small holes in said perforate member being sized to permit the flow of air therethrough while substantially blocking the flow of solid matter entrained in such air; and
 (g) means for mounting on said perforate member a container which is permeable to air, said mounting means holding an open end of said container adjacent said second large hole such that air flowing from said hole enters the open end of said container.

7. In a lawn tool comprising a motor and a housing mounted on wheels in which grass cuttings and/or leaves are discharged in a stream of air through a port in said housing, means for collecting said cuttings and/or leaves comprising:
 (a) a frame mounted toward the rear of said housing so as to rotate about an axis substantially parallel to the ground;
 (b) means for supporting said frame in a position extending upwardly and rearwardly of said housing;
 (c) a perforate member attached to said frame at a point removed from said axis of rotation, said perforate member containing therein a plurality of small holes and having a periphery which is not inwardly curving except in one region;
 (d) means for mounting a substantially impervious container beneath said perforate member with the upper periphery of said container against the periphery of said perforate member except in said one region where a large hole is defined by the periphery of said container and the periphery of said perforate member;
 (e) a chute connecting said port in said housing to said large hole;
 (f) a second large hole in said perforate member and means for mounting on said perforate member a container which is permeable to air, said mounting means holding an open end of said container adjacent said second large hole such that air flowing from said second hole enters the open end of said container; and
 (g) said small holes in said perforate member being sized to permit the flow of air therethrough while substantially blocking the flow of solid matter entrained in such air.

8. The apparatus of anyone of claims 1, 2, 5, 6 or 7 wherein said perforate member is a substantially flat screen, said screen has a mesh size of approximately one-quarter inch and the ratio between the surface area of said screen and the cross-sectional area of said chute at the point where the chute discharges through said large hole ranges upward from approximately three-to-one.

9. In a lawn tool comprising a motor and a housing mounted on wheels in which grass cuttings and/or leaves are discharged in a stream of air through a port of said housing, mean for collecting said cuttings and/or leaves comprising:
 (a) a frame mounted toward one side of said housing and extending upwardly and outwardly of said housing;
 (b) a perforate member attached to said frame, said perforate member containing therein first and second large holes and a plurality of small holes;
 (c) means for mounting a substantially impervious container beneath said perforate member with the upper periphery of said container against the periphery of said perforate member;
 (d) a chute connecting said port in said housing to said first large hole in said perforate member;
 (e) said small holes in said perforate member being sized to permit the flow of air therethrough while substantially blocking the flow of solid matter entrained in such air; and
 (f) means for mounting on said perforate member a container which is permeable to air, said mounting means holding an open end of said container adjacent said second large hole such that air flowing from said hole enters the open end of said container.

10. In a lawn tool comprising a handle, a motor and a housing mounted on wheels in which grass cuttings and/or leaves are discharged in a stream of air through a port in said housing, said handle comprising two interconnected members which are connected to said housing at spaced-apart points, means for collecting said cuttings and/or leaves comprising:
 (a) a frame mounted on said housing between the interconnected members of said handle so as to rotate about an axis substantially parallel to the ground;
 (b) a perforate member attached to said frame at a point removed from said axis of rotation, said perforate member containing therein at least one large hole and a plurality of small holes;
 (c) means for mounting a substantially impervious container beneath said perforate member with the upper periphery of said container against the periphery of said perforate member, the lowest edge of the upper periphery of said container being substantially above the ground;
 (d) means for supporting said frame on said housing, independent of said handle;
 (e) a chute connecting said port in said housing to said large hole in said perforate member; and (f) said small holes in said perforate member being sized to permit the flow of air therethrough while substantially blocking the flow of solid matter entrained in such air.

11. The apparatus of claim 10 wherein:
said chute has a curved portion in the end which is connected to said port and a substantially straight portion extending between said curved portion and said hole in said perforate member;
said perforate member is a substantially flat screen mounted on said frame so that it faces forward;
the straight portion of said chute makes an angle of approximately 35 degrees with the ground; and
the flat screen of said perforate member is mounted at an angle with respect to the straight portion of said chute such that said chute enters said large hole in said perforate member.

12. The apparatus of claim 2 wherein:
said perforate member is a substantially flat screen mounted on said frame so that it faces forward;
the straight portion of said chute makes an angle of approximately 35 degrees with the ground; and
the flat screen of said perforate member is mounted at an angle with respect to the straight portion of said chute such that said chute enters said large hole in said perforate member.

13. The apparatus of claim 2 or claim 10 wherein said frame is resiliently supported on said housing.

14. The apparatus of claim 2 or 10 wherein the large hole in the perforate member is defined by the periphery of said container and an inwardly curving portion of the periphery of said perforate member.

15. The apparatus of claim 2, 11, 12 or 13 further comprising a second large hole in said perforate member and means for mounting on said perforate member a container which is permeable to air, said mounting means holding an open end of said container adjacent said second large hole such that air flowing from said second hole enters the open end of said container.

* * * * *